US008203763B2

(12) United States Patent
Megawa et al.

(10) Patent No.: US 8,203,763 B2
(45) Date of Patent: Jun. 19, 2012

(54) IMAGE SCANNING APPARATUS AND METHOD FOR ALIGNING A STACK OF SCANNED IMAGES USING THE STACK ORIENTATION INDICATED BY A USER AND AN AUTOMATICALLY DETERMINED IMAGE ORIENTATION

(75) Inventors: Shunichi Megawa, Tagata-gun (JP); Masaaki Yasunaga, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1161 days.

(21) Appl. No.: 12/032,113

(22) Filed: Feb. 15, 2008

(65) Prior Publication Data
US 2009/0207435 A1    Aug. 20, 2009

(51) Int. Cl.
*H04N 1/40* (2006.01)

(52) U.S. Cl. ........ 358/448; 358/443; 358/400; 358/401; 358/474; 358/471; 382/297; 382/296; 382/293; 382/290; 382/289; 399/81; 399/371; 399/367; 399/365; 399/361

(58) Field of Classification Search .................. 358/448, 358/443, 400, 401, 474, 471; 382/297, 296, 382/293, 290, 289, 276; 399/81, 371, 367, 399/365, 361
See application file for complete search history.

(56) References Cited

U.S. PATENT DOCUMENTS

| 5,301,036 | A | * | 4/1994 | Barrett et al. | 358/448 |
| 6,148,119 | A | * | 11/2000 | Takaoka | 382/289 |
| 6,574,375 | B1 | * | 6/2003 | Cullen et al. | 382/290 |

FOREIGN PATENT DOCUMENTS

| JP | 05-233875 | 9/1993 |
| JP | 08-274970 | 10/1996 |
| JP | 10-150551 | 6/1998 |
| JP | 2001-030580 | 2/2001 |
| JP | 2001-043310 | 2/2001 |
| JP | 2002-063546 | 2/2002 |
| JP | 2003-145879 | 5/2003 |
| JP | 2004-178397 | 6/2004 |
| JP | 2007-328693 | 12/2007 |

* cited by examiner

*Primary Examiner* — Benny Tieu
*Assistant Examiner* — Paul F Payer
(74) *Attorney, Agent, or Firm* — Turocy & Watson, LLP

(57) ABSTRACT

An image scanning apparatus according to the invention includes: a scanning unit configured to scan each of plural images from plural originals that are inputted; a rotation designating unit configured to designate rotation of the plural images that are scanned, so that an orientation of the plural images that are scanned coincides with a desired image orientation; a first image rotating unit configured to rotate the image that is scanned, in accordance with the designated rotation of the image; an orientation determining unit configured to determine whether the image orientation rotated by the first image rotating unit coincides with the desired image orientation or not; and a second image rotating unit configured to, for an image determined as not coinciding by the orientation determining unit, further rotate the orientation of the image so that the orientation coincides with the desired image orientation.

11 Claims, 9 Drawing Sheets

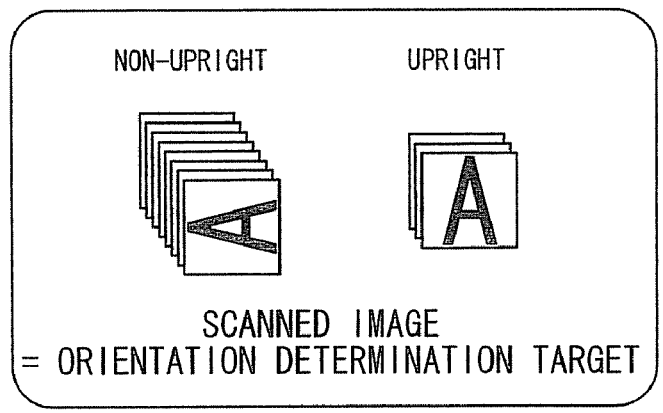

FIG. 5A

| | NUMBER OF PAGES THAT ARE UPRIGHT AT THE TIME OF ORIENTATION DETERMINATION | NUMBER OF PAGES THAT ARE NOT UPRIGHT AT THE TIME OF ORIENTATION DETERMINATION | TOTAL |
|---|---|---|---|
| NUMBER OF PAGES AS DETERMINATION TARGETS | 10 | 90 | 100 |
| NUMBER OF PAGES ON WHICH ORIENTATION CAN BE CORRECTLY DETERMINED | 9 | 72 | 81 |

PROBABILITY THAT ORIENTATION OF
UPRIGHT IMAGE CAN BE CORRECTLY DETERMINED    90%

PROBABILITY THAT ORIENTATION OF
NON-UPRIGHT IMAGE CAN BE CORRECTLY DETERMINED    80%

FIG. 5B

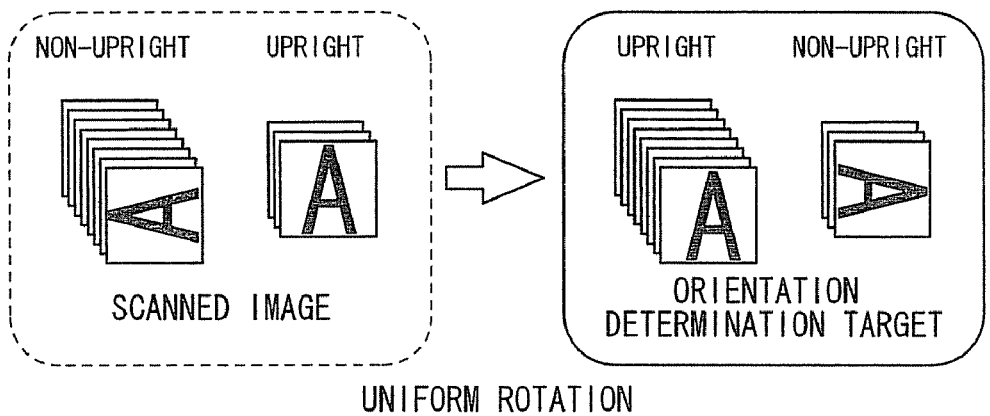

FIG. 6A

| | NUMBER OF PAGES THAT ARE UPRIGHT AT THE TIME OF ORIENTATION DETERMINATION | NUMBER OF PAGES THAT ARE NOT UPRIGHT AT THE TIME OF ORIENTATION DETERMINATION | TOTAL |
|---|---|---|---|
| NUMBER OF PAGES AS DETERMINATION TARGETS | 90 | 10 | 100 |
| NUMBER OF PAGES ON WHICH ORIENTATION CAN BE CORRECTLY DETERMINED | 81 | 8 | 89 |

PROBABILITY THAT ORIENTATION OF
UPRIGHT IMAGE CAN BE CORRECTLY DETERMINED     90%

PROBABILITY THAT ORIENTATION OF
NON-UPRIGHT IMAGE CAN BE CORRECTLY DETERMINED     80%

FIG. 6B

IMAGE SCANNING APPARATUS AND METHOD FOR ALIGNING A STACK OF SCANNED IMAGES USING THE STACK ORIENTATION INDICATED BY A USER AND AN AUTOMATICALLY DETERMINED IMAGE ORIENTATION

BACKGROUND OF THE INVENTION

1. Technical Field of the Invention

The present invention relates to an image scanning apparatus, an image forming apparatus and an image scanning method, and particularly to an image scanning apparatus, an image forming apparatus and an image scanning method for automatically and continuously scanning plural sheets of originals.

2. Related Art

As an image scanning apparatus such as a scanner or an image forming apparatus such as a copy machine, there is an apparatus having the function of rotating the orientation of scanned image data in accordance with a user's designation. With this function, for example, even for an original that is too large in size and therefore cannot be physically rotated on the original table, such as an A3-size original, the orientation of image data after being scanned can be rotated into a desired direction. Also, in the case of double-side scanning of plural sheets of originals on which double-side printing has been done for left-right binding or top-bottom binding, by using an automatic document feeder (ADF), the image data of all the pages can be aligned in the same orientation by rotating the orientation of scanned image data every other sheet.

However, in the case of inputting originals at a time by an ADF or the like, the originals are not necessarily inputted constantly in a regular orientation. In such cases, even if image data is rotated only in the orientation designated by the user, a multi-page file is eventually generated in which misalignment remains. Also, in the case where plural sheets of originals on which double-side printing has been done for left-right binding or top-bottom binding include an original inverted in the top-bottom direction or left-right direction, the orientation of all the pages cannot be aligned simply by rotation processing in the regular orientation. Of course, it is possible that the user designated the rotating direction for each page, but the operation burden on the user is large.

Meanwhile, JP-B-3343367 or the like discloses a technique of automatically determining the direction of a scanned original and enabling automatic alignment of the direction in the case where originals of different directions exist. Generally, originals may be vertically long originals and laterally long originals. Moreover, in the case of Japan, for both vertically long originals and horizontally long originals, there can be originals containing vertically written characters and originals containing laterally written characters. The techniques disclosed in JP-B-3343367 include a technique of detecting a blank area at the edge of an original, punch holes, staple holes and so on and determining the type and direction of a vertically long original or a horizontally long original, a technique of recognizing characters of a scanned character image, then collating it with a dictionary, and thereby determining the type and direction of vertically written characters or horizontally written characters, and so on.

However, in such automatic determination techniques, determination errors can necessarily occur. Generally, in many automatic determination techniques, basic determination processing based on regularity that can usually be expected and exception determination processing to deal with an exception that does not meet the regularity are often combined. However, it is practically impossible to cover all exceptions. For particular originals that cannot be covered by exception determination processing, determination errors necessarily tend to occur. Also, determination errors tend to occur for stained originals and blurred originals.

SUMMARY OF THE INVENTION

In view of the foregoing circumstances, it is an object of the invention to provide an image scanning apparatus, an image forming apparatus and an image scanning method in which the orientation of plural sheets of originals that are scanned is determined with less determination errors and the direction of image data can be aligned in a designated direction even in the case where originals of different orientations exist.

To achieve the above object, an image scanning apparatus according to an aspect of the invention includes: a scanning unit configured to scan each of plural images from plural originals that are inputted; a rotation designating unit configured to designate rotation of the plural images that are scanned, so that an orientation of the plural images that ate scanned coincides with a desired image orientation; a first image rotating unit configured to rotate the image that is scanned, in accordance with the designated rotation of the image; an orientation determining unit configured to determine whether the image orientation rotated by the first image rotating unit coincides with the desired image orientation or not; and a second image rotating unit configured to, for an image determined as not coinciding by the orientation determining unit, further rotate the orientation of the image so that the orientation coincides with the desired image orientation.

Also, an image forming apparatus according to another aspect of the invention includes: a scanning unit configured to scan each of plural images from plural originals that are inputted; a rotation designating unit configured to designate rotation of the plural images that are scanned, so that an orientation of the plural images that are scanned coincides with a desired image orientation; a first image rotating unit configured to rotate the image that is scanned, in accordance with the designated rotation of the image; an orientation determining unit configured to determine whether the image orientation rotated by the first image rotating unit coincides with the desired image orientation or not; a second image rotating unit configured to, for an image determined as not coinciding by the orientation determining unit, further rotate the orientation of the image so that the orientation coincides with the desired image orientation; and a printing unit configured to print the image rotated by the second image rotating unit.

Moreover, an image scanning method according to still another aspect of the invention includes: scanning each of plural images from plural originals that are inputted; designating rotation of the plural images that are scanned, so that an orientation of the plural images that are scanned coincides with a desired image orientation; rotating the image that is scanned, in accordance with the designated rotation of the image; determining whether the orientation of the rotated image coincides with the desired image orientation or not; and for an image determined as not coinciding, further rotating the orientation of the image so that the orientation coincides with the desired image orientation.

BRIEF DESCRIPTION OF THE DRAWINGS

In the attached drawings,

FIG. 5A and FIG. 5B are views each showing the concept and problems of conventional image rotation processing;

FIG. 6A and FIG. 6B are views each showing the concept and advantages of image rotation processing in the image forming apparatus and the image scanning apparatus according to the first embodiment;

DETAILED DESCRIPTION OF THE PREFERRED EMBODIMENTS

Embodiments of an image scanning apparatus, an image forming apparatus and an image scanning method according to the invention will be described with reference to the attached drawings.

(1) First Embodiment

Figure 1:
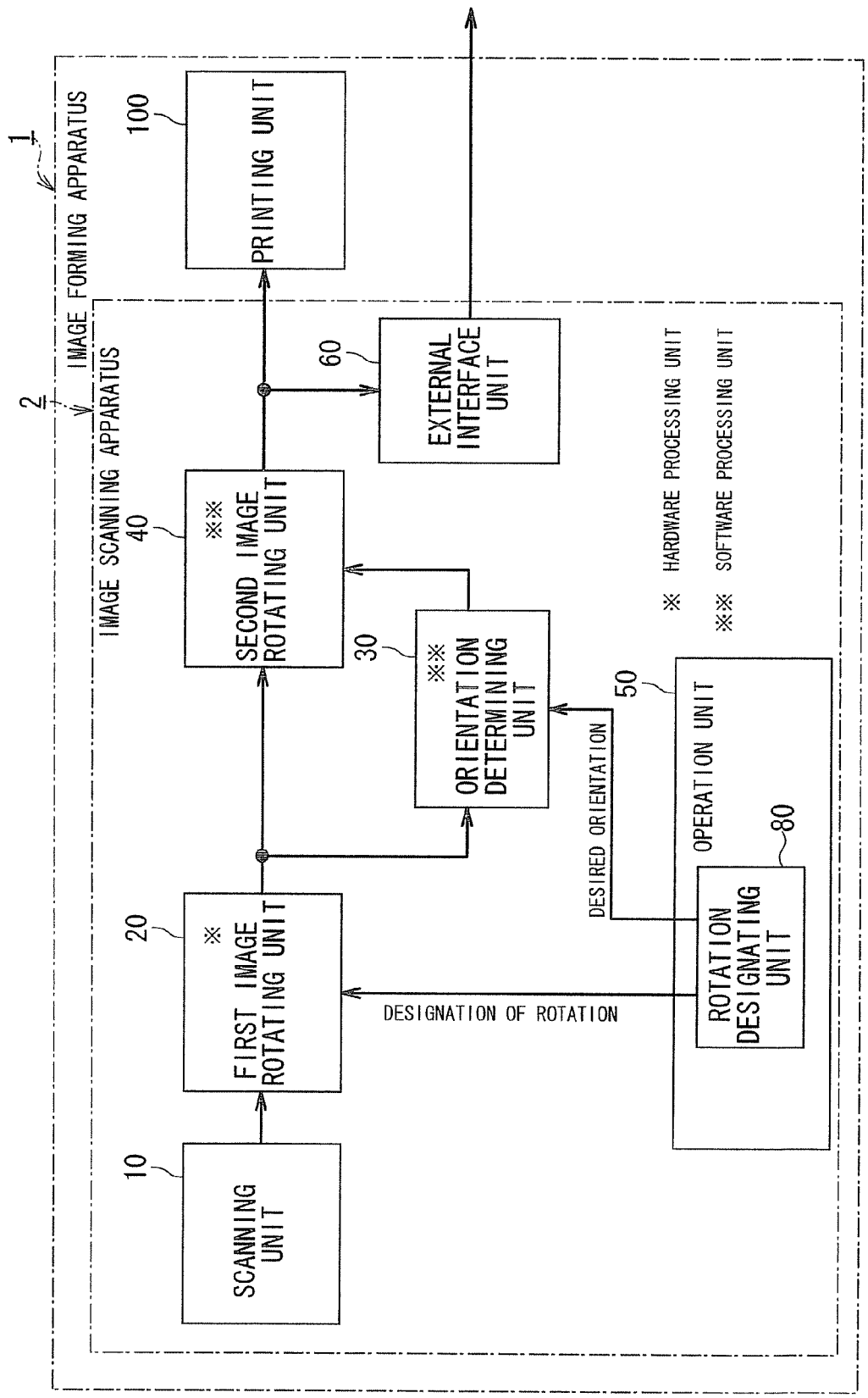
FIG. 1 is a block diagram showing an exemplary configuration of an image forming apparatus and an image scanning apparatus according to the first embodiment of the invention.

FIG. 1 is a block diagram showing an exemplary configuration of an image forming apparatus 1 and an image scanning apparatus 2 according to the first embodiment.

The image forming apparatus 1 is, for example, a copy machine or a digital multi-function peripheral. The image forming apparatus 1 is configured by having at least the image scanning apparatus 2 and a printing unit 100.

The image scanning apparatus 2 is an apparatus having the scanner function to scan originals and can be caused to function as a part of the copy function or to function independently as a scanner. In the case where the image scanning apparatus 2 is caused to function as a scanner, image data of scanned originals are to be outputted to an external personal computer or server.

The printing unit 100 is, for example, a printing unit that uses an electrophotographic system and prints image data outputted from the mage scanning apparatus 2 onto a sheet as a black-and-white or color print.

The image scanning apparatus 2 is configured by having a scanning unit 10, a first image rotating unit 20, an orientation determining unit 30, a second image rotating unit 40, an operation unit 50, an external interface unit 60 and the like.

The scanning unit 10 is a unit that optically scans originals and generates image data (hereinafter simply referred to as an image). The scanning unit 10 is capable of scanning originals one by one via a contact glass stand (not shown). In this embodiment, the scanning unit 10 also has an automatic document feeder (ADF) that automatically scans plural originals.

The orientation of the original set on the ADF is not always the same orientation. Also, the plural originals may include originals having different orientations. Therefore, the orientation of images scanned by the ADF is not necessarily aligned with the orientation desired by the user. The first image rotating unit 20, the orientation determining unit 30 and the second image rotating unit 40 are units provided to align the orientation of scanned images with the orientation desired by the user. The detailed operations of these will be described later.

The operation unit 50 is a so-called control panel, for example, a unit configured by having a touch panel or various operation buttons superimposed on a liquid crystal display. The operation unit 50 has a rotation designating unit 80. The orientation of the image desired by the user and designation information about the rotation of the original are inputted from the rotation designating unit 80.

Figure 2:
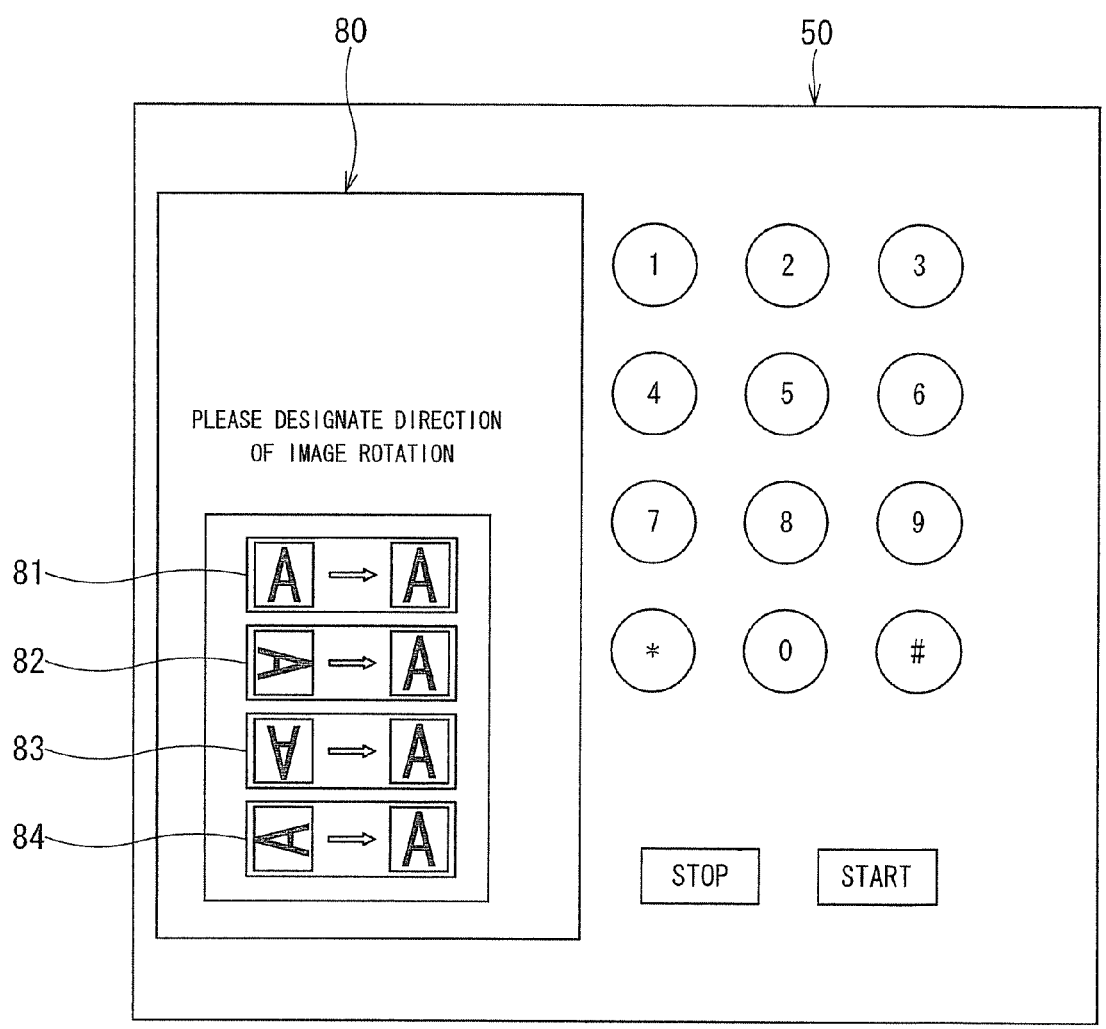
FIG. 2 is a view showing an exemplary outline or an exemplary display of an operation unit and a rotation designating unit according to the first embodiment.

FIG. 2 is a view showing an exemplary outline or an exemplary display of the operation unit 50 including the rotation designating unit 80. The rotation designating unit 80 shown in FIG. 2 is realized as one of functions of a multi-function panel configured by a liquid crystal display, a touch panel and so on. In this example, the rotation designating unit 80 has an operation explanatory display part showing "Please designate the direction of image rotation" and so on, and first to fourth operation buttons 81 to 84 configured by a touch panel.

The first to fourth operation buttons 81 to 84 are operation buttons to give instructions to uniformly rotate the orientation of the original. The relations between the orientation of the original set on the ADF (or contact glass stand) and the desired image orientation (the image orientation that the user wishes to obtain) are shown by arrows. The first to fourth operation buttons 81 to 84 can designate the rotation of the image with respect to the original (the orientation of rotation and the quantity of rotation) and can also designate the desired image orientation.

In the example shown in FIG. 2, the desired image orientation is the upright orientation for all (the orientation in which the character can be read upright as viewed from the operating position of the user).

For the rotation of the image, the first operation button 81 can designate non-rotation, the second operation button 82 can designate 90-degree left rotation, the third operation button 83 can designate 180-degree rotation, and the fourth operation button 84 can designate 90-degree right rotation.

The information about rotation (the orientation of rotation and the quantity of rotation) designated by the rotation designating unit 80 is transmitted to the first image rotating unit 20 and the scanned original images are uniformly rotated. Even in the case where the plural originals include originals of different orientations, the first image rotating unit 20 uniformly rotates all the scanned images in the same direction and by the same quantity.

Figure 3:
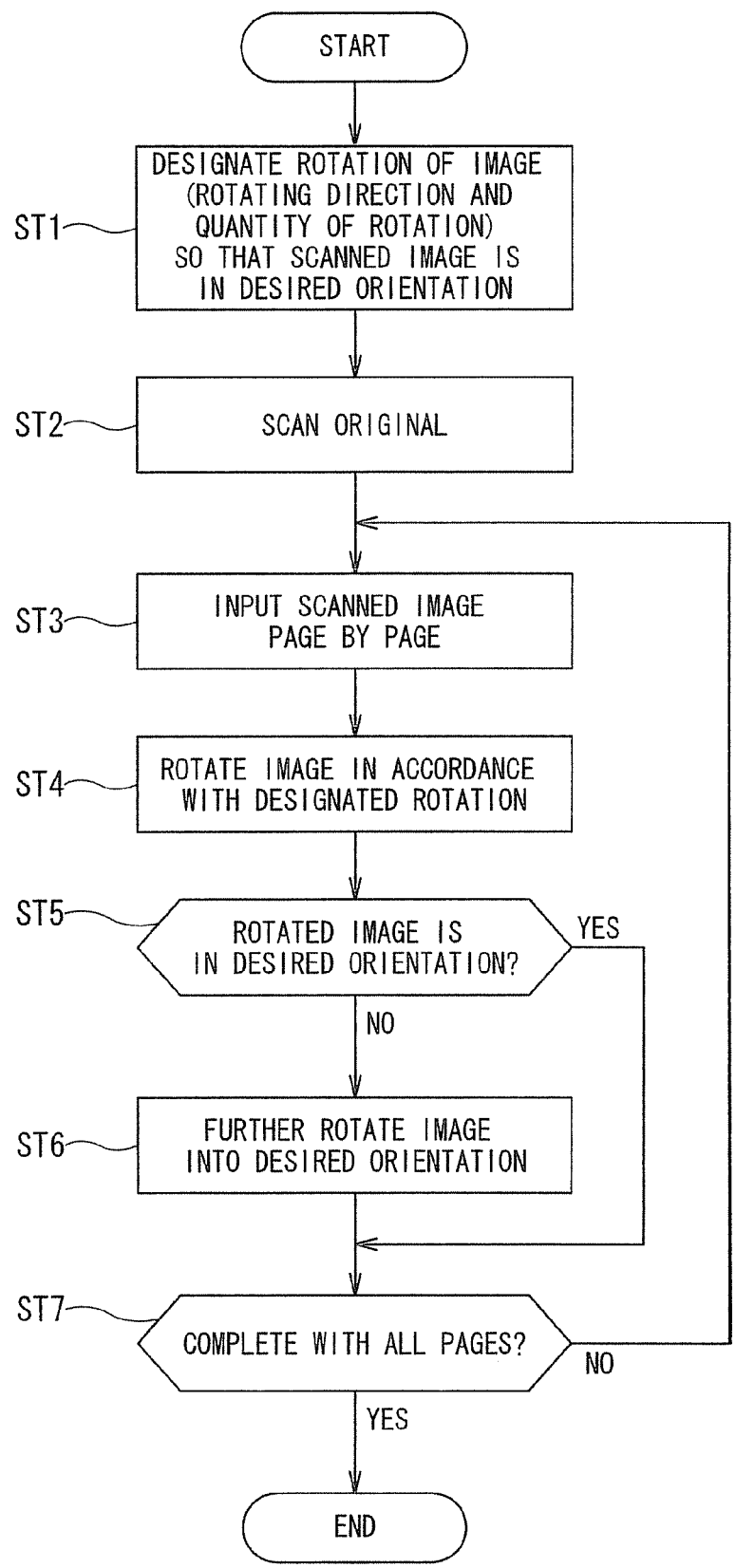
FIG. 3 is a flowchart showing an example of image rotation processing in the image forming apparatus and the image scanning apparatus according to the first embodiment.
Figure 4:
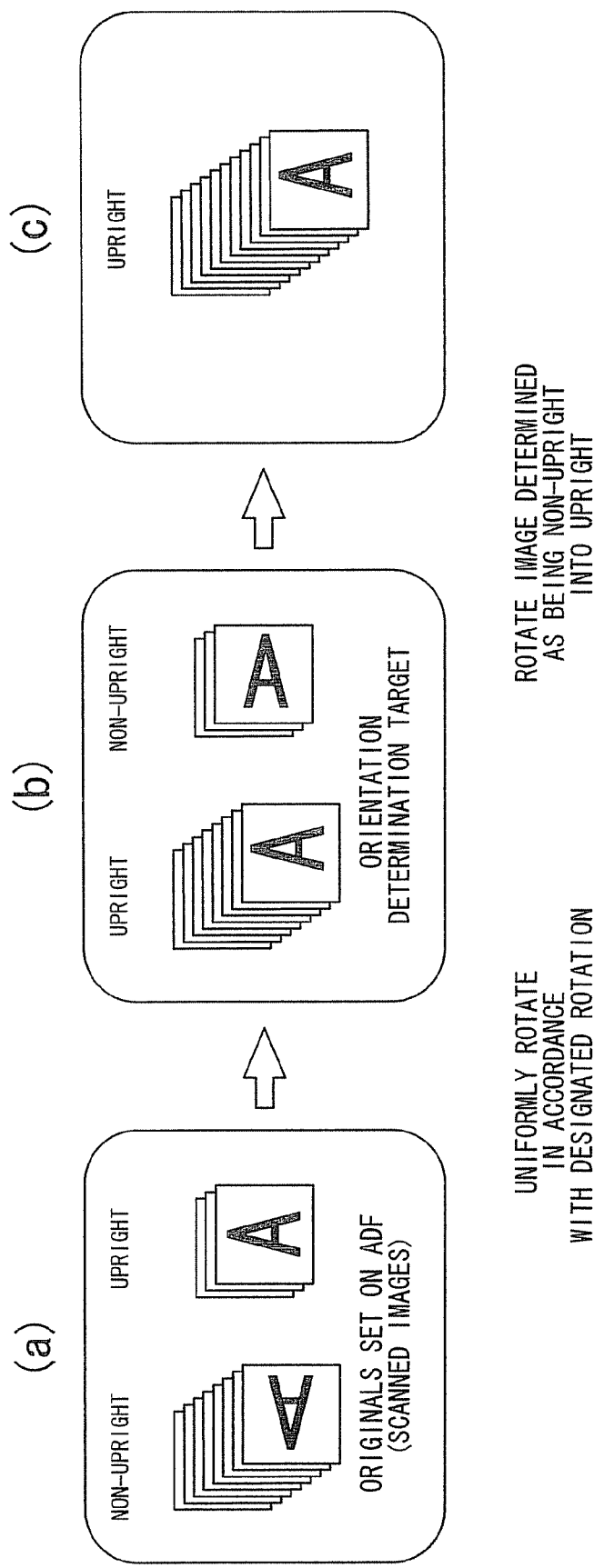
FIG. 4 is a conceptual explanatory view of image rotation processing in the image forming apparatus and the image scanning apparatus according to the first embodiment.

The operation (image scanning method) of the image scanning apparatus 2 (and the image forming apparatus 1) configured as described above, and particularly the operation related to the rotation of images will be described mainly with reference to FIG. 3 and FIG. 4. FIG. 3 is a flowchart showing an example of image rotation processing. FIG. 4 is a conceptual view of the operation.

First, the user sets plural originals to be scanned on the ADF without particularly being aware of their orientation. FIG. 4(a) is a view showing an example of the orientation of plural originals set on the ADF and shows a state where the majority of the originals (majority originals) are in a non-upright orientation and the remaining minority originals are in the upright orientation. That is, in this example, the minority originals are in the desired image orientation and the majority originals are in an image orientation that is not desired.

Next, the user confirms the orientation of the majority originals set on the ADF and designates rotation of the images so that the orientation of the scanned images of the majority originals turns into the desired image orientation (step ST1 in FIG. 3). In the example of FIG. 4(a), the orientation of the majority originals is rotated 90 degrees to the left with respect to the upright direction. Therefore, in order to turn this into the desired orientation (upright orientation), it must be rotated 90 degrees to the right. Thus, the user presses the fourth operation button 84 of the rotation designating unit 80 and designates the rotation.

After that, start of original scanning is designated by using a proper operation button (not shown). In accordance with this designation, the originals are scanned (step ST2).

The images of the scanned originals are inputted page by page (sheet by sheet of the originals) to the first image rotating unit 20. In accordance with the designated rotation (in this case, 90-degree right rotation), the images are uniformly rotated (step ST4).

FIG. 4(b) is a view collectively showing all the images outputted from the first image rotating unit 20. FIG. 4(b) shows a state where the orientation of the majority originals is rotated into the upright orientation whereas the orientation of the minority originals is rotated into a non-upright orientation.

Next, it is determined whether the orientation of the images rotated by the first image rotating unit 20 is the desired image orientation (upright orientation) or not (step ST5). This determination is carried out by the orientation determining unit 30.

The orientation determining unit 30 carries out orientation determination to determine which of the four directions the orientation of each image (that is, each page) is in. Here, the four directions are the upright orientation, the orientation 90 degrees to the right with respect to the upright orientation, the orientation 90 degrees to the left with respect to the upright orientation, and the orientation that is 180 degrees with respect to the upright orientation.

As a method of orientation determination, for example, there is a method utilizing matching between a character string and a dictionary. For example, it is a method in which character strings in the four directions are cut out of the image and then which of the four directions the orientation of the image is in is estimated on the basis of character recognition of the character string cut out in each direction and their matching with a dictionary.

If the estimated image orientation is not the desired image orientation, the image is further rotated so as to be in the desired image orientation (step ST6). This rotation is carried out by the second image rotating unit 40.

If the estimated image orientation is the desired image orientation, additional rotation processing is not carried out to that image, as a matter of course.

The above processing of steps ST3 to ST6 is repeated for all pages (step ST7). After that, the processing ends.

Meanwhile, in the case where the only the function of aligning the orientation of all plural images including upright images and non-upright images with the upright images is considered, it is possible in principle to achieve the intended function by carrying out image rotation processing once. On the other hand, in this embodiment, image rotation is carried out in two stages, that is, the image rotation by the first image rotating unit 20 and the image rotation by the second image rotating unit 40, as described above. The reason for and advantages of this will be described hereinafter.

FIG. 5A and FIG. 5B are views showing an example of image rotation processing that has conventionally been carried out, and its problems. For comparison with this embodiment, it is assumed that images scanned by the ADF of the majority originals are non-upright and those of minority originals are upright, as in FIG. 4(a). In the case of carrying out image rotation processing once, it should be "correctly determined" that the non-upright images of the majority originals are "non-upright", and to rotate the orientation of all these majority originals.

However, generally, the probability that the orientation of a non-upright image can be correctly determined is lower than the probability that the orientation of an upright image can be correctly determined. Therefore, in the case where the plural originals scanned by the ADF include more non-upright pages than upright pages, the number of pages on which the orientation can be correctly determined is smaller.

For example, it is assumed that, of 100 pages of originals, 10 pages are upright originals and 90 pages are non-upright originals, as shown in FIG. 5B. It is also assumed that the probability that the orientation of an upright image can be correctly determined is 90% and the probability that the orientation of a non-upright image can be correctly determined is 80%. In this case, the number of upright pages that have their orientation determined correctly is 9 pages (10 pages× 0.9) and the number of non-upright pages that have their orientation determined correctly is 72 pages (90 pages×0.8). The total number of pages on which the orientation can be correctly determined is 81 pages.

On the other hand, the image scanning apparatus 2 according to this embodiment carries out image rotation in two stages and thus can increase the number of pages on which the orientation can be correctly determined. FIG. 6A and FIG. 6B show this fact.

FIG. 6A shows a state where 90 pages of non-upright originals are turned into 90 pages of upright originals and 10 pages of upright originals are turned into 10 pages of non-upright originals by the first image rotating unit 20. As a result, the images to be targets of orientation determination are 90 pages of upright originals and 10 pages of non-upright originals. When the same probabilities as in the above example are applied, the number of upright pages that have their orientation determined correctly is 81 pages (90 pages× 0.9) and the number of non-upright pages that have their orientation determined correctly is 8 pages (10 pages×0.8), as shown in FIG. 6B. The total number of pages on which the orientation can be correctly determined is 89 pages.

In this manner, as the first image rotating unit 20 is provided in the stage prior to the orientation determination processing and the orientation is converted so that majority originals become upright as targets of orientation determination, the probability that the orientation can be correctly determined is improved. Consequently, the number of uptight images outputted from the second image rotating unit 40 is larger than in the case of carrying out image rotation processing only once.

The first image rotating unit 20 and the second image rotating unit 40 can be configured as hardware processing units (units including a page memory, an operation circuit and so on) or can be configured as software processing units. However, the first image rotating unit 20 is required to have a high speed characteristic because it carries out rotation processing to all scanned images. Therefore, a higher processing speed can be realized if the first image rotating unit 20 is configured as a hardware processing unit.

Meanwhile, it suffices that the second image rotating unit 40 rotates minority images that are determined as being non-upright and the second image rotating unit 40 does not have to operate as fast as the first image rotating unit 20. Therefore, the second image rotating unit 40 can be configured as a software processing unit.

Also, since the second image rotating unit 40 carries out rotation processing based on the result of determination by the orientation determining unit 30, the second image rotating unit 40 is linked with the processing by the orientation determining unit 30. Meanwhile, the processing by the orientation determining unit 30 includes complicated determination processing and therefore software processing is more advantageous for this. Thus, in view of the processing linked with the orientation determining unit 30, it is preferable that the second image rotating unit 40 is configured as a software processing unit.

(2) Other Embodiments

Figure 7:
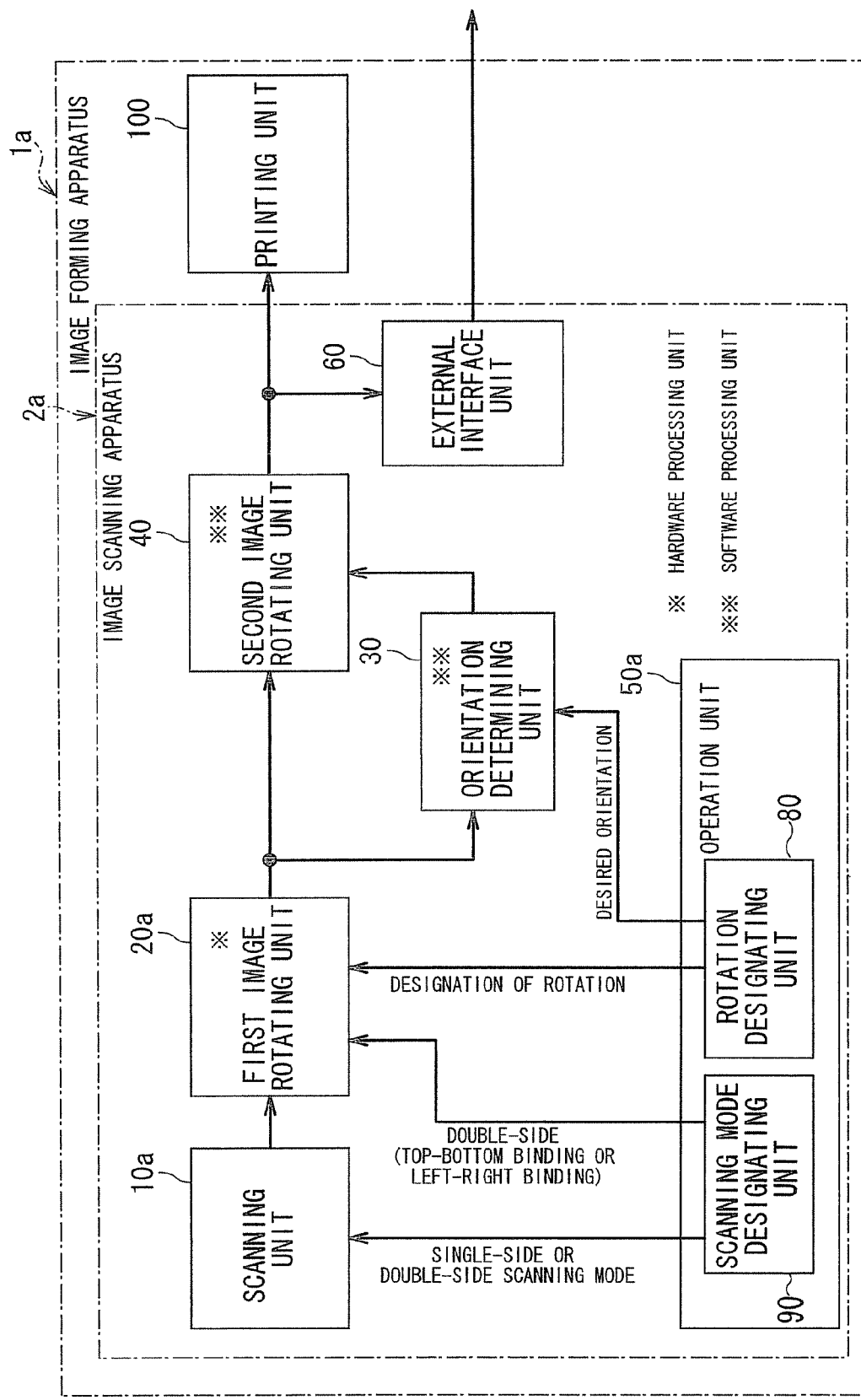
FIG. 7 is a block diagram showing an exemplary configuration of an image forming apparatus and an image scanning apparatus according to the second embodiment of the invention.

FIG. 7 is a block diagram showing an exemplary configuration of an image forming apparatus 1a and an image scanning apparatus 2a according to the second embodiment. Its difference from the first embodiment is that the function of scanning double-side printed originals is added.

Therefore, the image forming apparatus 1a and the image scanning apparatus 2a according to the second embodiment employ a configuration in which a scanning mode designating unit 90 for designating scanning of a single-side original or a double-side original is provided in an operation unit 50a.

Figure 8:
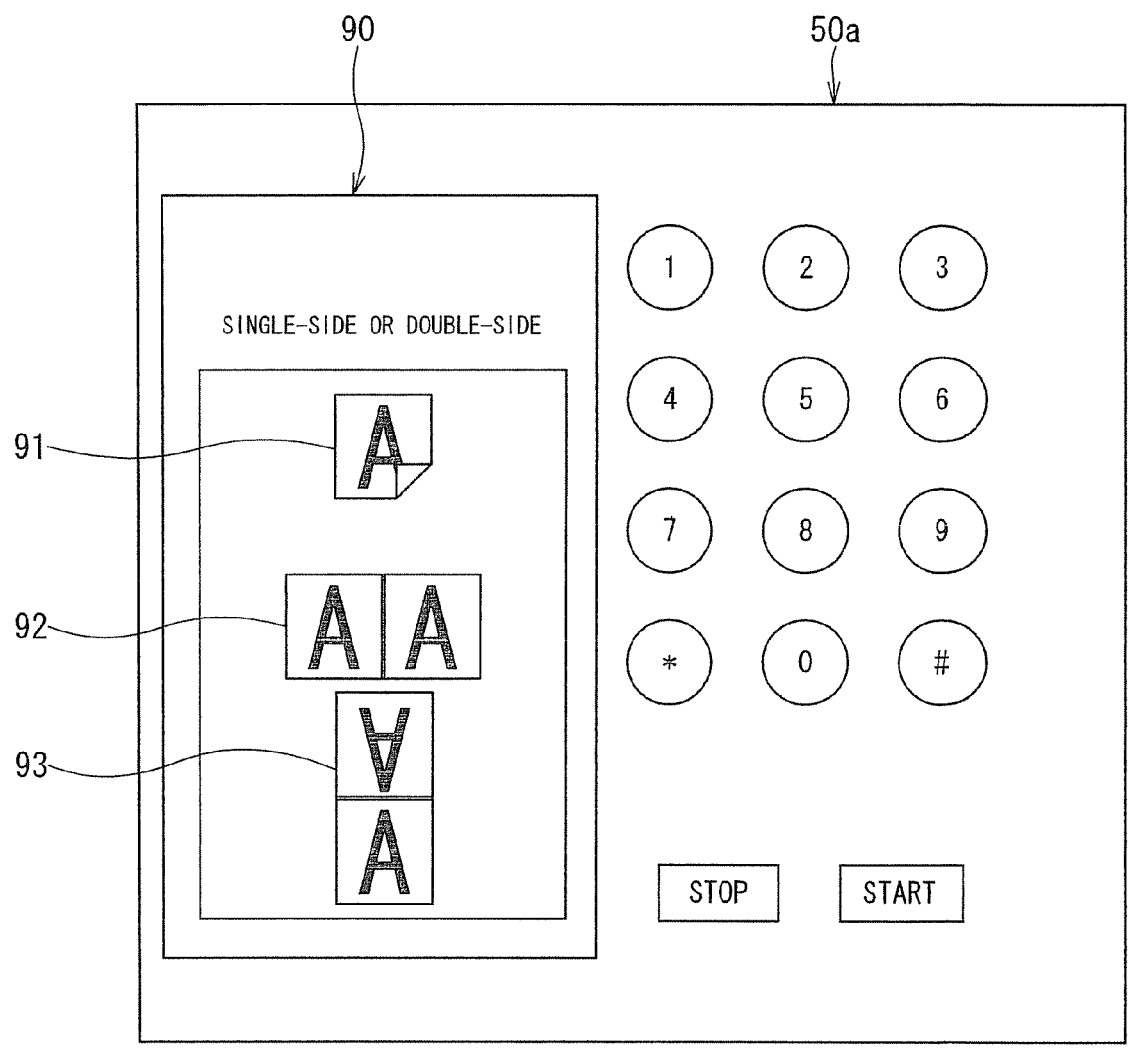
FIG. 8 is a view showing an exemplary outline or an exemplary display of an operation unit and a scanning mode designating unit according to the second embodiment.

FIG. 8 is a view showing an exemplary display of the scanning mode designating unit 90 configured as a touch panel. FIG. 8 shows a state where the display has been switched from the display of the rotation designating unit 80 configured as multi-function panel to the display of the scanning mode designating unit 90. The scanning mode designating unit 90 is provided with a single-side button 91 that designates scanning of a single-side original, a double-side left-right button 92 that designates scanning of a double-side left-right bound original, a double-side top-bottom button 93 that designates scanning of a double-side top-bottom bound original, and so on.

For example, in the case where a double-side left-right bound original that is vertically long is set on the ADF in its longitudinal direction, an top-bottom inverted image is generated every even-number page unless rotation is carried out at all. In such cases, if the double-side left-right binding scanning mode is set by the double-side left-right button 92, the rotating direction is designated in order to carry out 180-degree rotation of even-number pages without rotating odd-number pages. This rotation is carried out by a first image rotating unit 20a. As a result, images with a perfectly aligned page orientation can be generated.

Meanwhile, even in the case of double-side bound originals, they may include originals in different orientations. In such cases, designation of a scanning mode and designation of uniform rotation may be combined. For example, if majority originals are non-upright originals that have been rotated 90 degrees to the left from the upright direction, it is possible to align the orientation of all the images with the upright orientation by designating "90-degree right rotation" and "double-side left-right binding".

Figure 9:
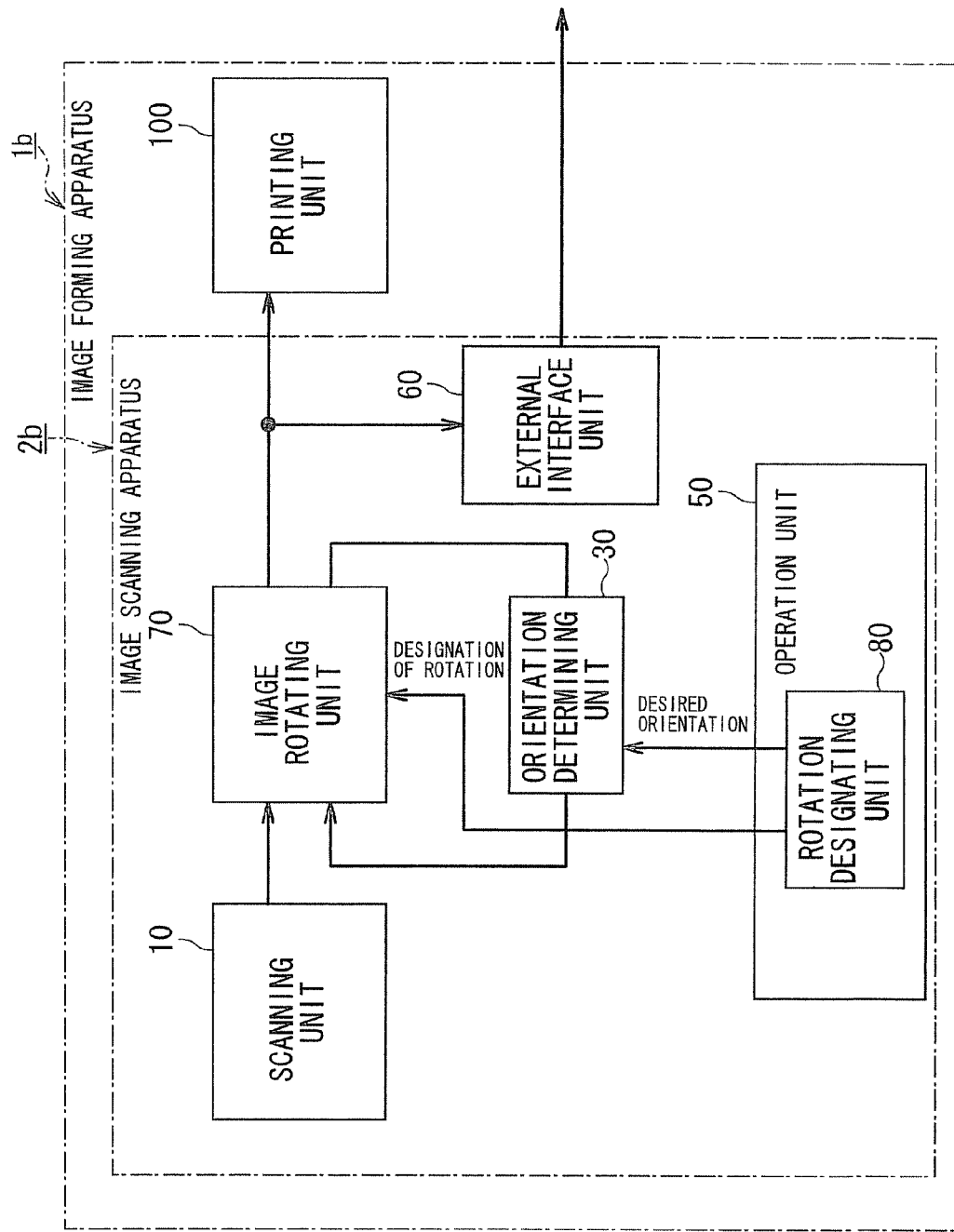
FIG. 9 is a block diagram showing an exemplary configuration of an image forming apparatus and an image scanning apparatus according to the third embodiment of the invention.

FIG. 9 is a block diagram showing an exemplary configuration of an image forming apparatus 1b and an image scanning apparatus 2b according to the third embodiment. Its difference from the first embodiment is that the functions of the first image rotating unit 20 and the second image rotating unit 40 are realized in one configuration (image rotating unit 70).

For scanned images outputted from the scanning unit 10, uniform rotation processing is carried out by the image rotating unit 70 in accordance with rotation information designated by the rotation designating unit 80. The output of this rotation processing is inputted to the orientation determining unit 30 and is also sent back to the image rotating unit 70. In the orientation determining unit 30, the orientation is determined and images that are not in the desired orientation (non-upright images) are detected. Rotation processing is carried out only to the non-upright images of the images sent back to the image rotating unit 70. By the two rounds of rotation processing, the orientation of the images is aligned. By the first round of rotation processing, the orientation of the majority originals is turned to the desired orientation (upright). Therefore, the advantage of reduced errors in orientation determination can be achieved as in the first embodiment. Consequently, the probability increases that all the images are aligned in the upright orientation by the second round of rotation processing.

In the case where the image rotating unit 70 is configured as a hardware processing unit, the number of input and output channels for image data and control circuits increase, but the hardware scale is not very different from that of the first embodiment.

It is also possible to configure the image rotating unit 70 as a software processing unit. In this case, a high-speed processor and the like are required, but miniaturization can be realized compared to the case of configuring the entire image rotating unit 70 as a hardware processing unit.

As has been described above, with the image scanning apparatus, the image forming apparatus and the image scanning method according to the above embodiments, the orientation of plural sheets of originals that are scanned can be determined with less determination errors, and even in the case where there are originals in different orientations, the direction of image data can be aligned in a designated direction.

The present invention is not limited to the above embodiments. Practically, its components can be modified and specified without departing from the scope of the invention. Also, various embodiments of the invention can be formed by proper combinations of plural components disclosed in the above embodiments. For example, some of the components disclosed in the embodiments may be deleted. Moreover, components of different embodiments can be properly combined.

What is claimed is:

1. An image scanning apparatus comprising:
    a scanning unit configured to scan each of a plurality of images from a plurality of originals that are inputted, the plurality of originals including majority originals that are in the same orientation and minority originals that are in a different orientation from the majority originals;
    a rotation designating unit configured to designate rotation of the plurality of the images that are scanned so that the image orientation with respect to the majority originals coincides with an upright orientation;
    a first image rotating unit configured to rotate the scanned image in accordance with the designated rotation;
    an orientation determining unit configured to determine whether the image orientation rotated by the first image rotating unit coincides with the upright orientation or not; and a second image rotating unit configured to, for an image determined as not coinciding by the orientation determining unit, further rotate the orientation of the image so that the orientation coincides with the upright orientation.

2. The image scanning apparatus according to claim 1, wherein the scanning unit is capable of scanning each of a face-side image and a back-side image of a double-side printed original when a double-side scanning mode is set, and when the double-side scanning mode is set and the face-side image and the back-side image have orientations that do not coincide with each other, the first image rotating unit rotates the orientation of the face-side image or the orientation of the back-side image so that the orientations of both images coincide with each other, and further rotates the scanned images in accordance with designated rotation of the images.

3. The image scanning apparatus according to claim 1, wherein the orientation determining unit cuts out character strings in four directions from the scanned image and determines whether the orientation of the image coincides with the upright orientation or not, in accordance with character recognition of the character string that is cut out in each direction and matching processing with a dictionary.

4. The image scanning apparatus according to claim 1, wherein the first image rotating unit is a unit configured by a hardware circuit, and the second image rotating unit is a unit realized by software processing.

5. An image forming apparatus comprising:

a scanning unit configured to scan each of a plurality of images from a plurality of originals that are inputted, the plurality of originals including majority originals that are in the same orientation and minority originals that are in a different orientation from the majority originals;

a rotation designating unit configured to designate rotation of the plurality of the images that are scanned so that image orientation with respect to the majority originals coincides with an upright orientation;

a first image rotating unit configured to rotate the scanned image in accordance with the designated rotation;

an orientation determining unit configured to determine whether the image orientation rotated by the first image rotating unit coincides with the upright orientation or not;

a second image rotating unit configured to, for an image determined as not coinciding by the orientation determining unit, further rotate the orientation of the image so that the orientation coincides with the upright orientation; and a printing unit configured to print the image rotated by the second image rotating unit.

6. The image forming apparatus according to claim 5, wherein the scanning unit is capable of scanning each of a face-side image and a back-side image of a double-side printed original when a double-side scanning mode is set, and when the double-side scanning mode is set and the face-side image and the back-side image have orientations that do not coincide with each other, the first image rotating unit rotates the orientation of the face-side image or the orientation of the back-side image so that the orientations of both images coincide with each other, and further rotates the scanned images in accordance with designated rotation of the images.

7. The image forming apparatus according to claim 5, wherein the orientation determining unit cuts out character strings in four directions from the scanned image and determines whether the orientation of the image coincides with the upright orientation or not, in accordance with character recognition of the character string that is cut out in each direction and matching processing with a dictionary.

8. The image forming apparatus according to claim 5, wherein the first image rotating unit is a unit configured by a hardware circuit, and the second image rotating unit is a unit realized by software processing.

9. An image scanning method comprising:

scanning each of a plurality of images from a plurality of originals that are inputted, the plurality of originals including majority originals that are in the same orientation and minority originals that are in a different orientation from the majority originals;

designating rotation of the plurality of the images that are scanned so that image orientation with respect to the majority originals coincides with an upright orientation;

rotating the scanned image in accordance with the designated rotation;

determining whether the orientation of the rotated image coincides with the upright orientation or not; and for an image determined as not coinciding, further rotating the orientation of the image so that the orientation coincides with the upright image orientation.

10. The image scanning method according to claim 9, wherein in the scanning, it is possible to scan each of a face-side image and a back-side image of a double-side printed original when a double-side scanning mode is set, and in the rotating, when the double-side scanning mode is set and the face-side image and the back-side image have orientations that do not coincide with each other, the orientation of the face-side image or the orientation of the back-side image is rotated so that the orientations of both images coincide with each other, and the scanned images are further rotated in accordance with designated rotation of the images.

11. The image scanning method according to claim 9, wherein in the determining, character strings in four directions are cut out from the scanned image and it is determined whether the orientation of the image coincides with the upright orientation or not, in accordance with character recognition of the character string that is cut out in each direction and matching processing with a dictionary.

* * * * *